US010457840B2

(12) United States Patent
Henry et al.

(10) Patent No.: US 10,457,840 B2
(45) Date of Patent: Oct. 29, 2019

(54) FOAMED ADHESIVE

(75) Inventors: Christophe Henry, Molsheim (FR); Thomas Pedrollo, Molsheim (FR)

(73) Assignee: Zephyros, Inc., Romeo, MI (US)

(*) Notice: Subject to any disclaimer, the term of this patent is extended or adjusted under 35 U.S.C. 154(b) by 416 days.

(21) Appl. No.: 13/876,629

(22) PCT Filed: Sep. 30, 2011

(86) PCT No.: PCT/EP2011/004891
§ 371 (c)(1),
(2), (4) Date: Mar. 28, 2013

(87) PCT Pub. No.: WO2012/041513
PCT Pub. Date: Apr. 5, 2012

(65) Prior Publication Data
US 2013/0186551 A1 Jul. 25, 2013

(30) Foreign Application Priority Data
Sep. 30, 2010 (GB) .................................. 1016530.6

(51) Int. Cl.
C09J 133/08 (2006.01)
C08J 3/24 (2006.01)
C08J 9/00 (2006.01)
C09J 163/00 (2006.01)
C08K 3/26 (2006.01)
C08K 3/36 (2006.01)
C08K 5/14 (2006.01)
C08L 23/08 (2006.01)
C08L 31/04 (2006.01)
C08L 57/02 (2006.01)

(52) U.S. Cl.
CPC ............. *C09J 133/08* (2013.01); *C08J 3/247* (2013.01); *C08J 9/0061* (2013.01); *C08J 9/0066* (2013.01); *C09J 163/00* (2013.01); C08J 2201/026 (2013.01); C08J 2203/04 (2013.01); C08J 2207/02 (2013.01); C08J 2323/08 (2013.01); C08J 2493/00 (2013.01); C08K 3/26 (2013.01); C08K 3/36 (2013.01); C08K 5/14 (2013.01); C08L 23/0853 (2013.01); C08L 31/04 (2013.01); C08L 57/02 (2013.01); C08L 2312/00 (2013.01)

(58) Field of Classification Search
CPC ........ C09J 163/00; C09J 133/08; C08J 3/247; C08J 9/0066; C08J 9/0061; C08J 2201/026; C08J 2203/04; C08J 2207/02; C08J 2323/08; C08J 2493/00; C08J 133/08; C08K 3/26; C08K 3/36; C08K 5/14; C08L 23/0853; C08L 31/04; C08L 57/02; C08L 2312/00
USPC ........................................................ 524/493
See application file for complete search history.

(56) References Cited

U.S. PATENT DOCUMENTS

| 4,610,836 A | 9/1986 | Wycech |
| 4,751,429 A | 6/1988 | Wycech |
| 4,769,391 A | 9/1988 | Wycech |
| 4,923,902 A | 5/1990 | Wycech |
| 5,040,803 A | 8/1991 | Cieslik et al. |
| 5,118,531 A * | 6/1992 | Petersen ................. C08J 9/0061 427/230 |
| 5,160,465 A | 11/1992 | Soderberg |
| 5,274,006 A | 12/1993 | Kagoshima et al. |
| 5,373,027 A * | 12/1994 | Hanley .................... B60R 13/08 521/134 |
| 5,804,608 A | 9/1998 | Nakazato et al. |
| 5,806,919 A | 9/1998 | Davies |
| 5,931,474 A | 8/1999 | Chang et al. |
| 5,992,923 A | 11/1999 | Wycech |
| 5,994,422 A | 11/1999 | Born et al. |
| 6,040,350 A | 3/2000 | Fukui |
| 6,103,784 A | 8/2000 | Hilborn et al. |
| 6,135,542 A | 10/2000 | Emmelmann et al. |
| 6,199,940 B1 | 3/2001 | Hopton et al. |
| 6,233,826 B1 | 5/2001 | Wycech |
| 6,321,793 B1 | 11/2001 | Czaplicki et al. |
| 6,357,819 B1 | 3/2002 | Yoshino |
| 6,376,564 B1 | 4/2002 | Harrison |
| 6,378,933 B1 | 4/2002 | Schoen et al. |
| 6,467,834 B1 | 10/2002 | Barz et al. |
| 6,479,560 B2 | 11/2002 | Freitag et al. |
| 6,482,486 B1 | 11/2002 | Czaplicki et al. |
| 6,523,857 B1 | 2/2003 | Hopton et al. |
| 6,548,593 B2 | 4/2003 | Merz et al. |
| 6,573,309 B1 | 6/2003 | Reitenbach et al. |
| 6,619,727 B1 | 9/2003 | Barz et al. |
| 6,641,208 B2 | 11/2003 | Czaplicki et al. |
| 6,733,040 B1 | 5/2004 | Simboli |
| 6,776,869 B1 | 8/2004 | Schenkel |
| 6,787,579 B2 | 9/2004 | Czaplicki et al. |
| 6,846,559 B2 | 1/2005 | Czaplicki et al. |
| 6,928,736 B2 | 8/2005 | Czaplieki et al. |
| 7,141,194 B1 | 11/2006 | Beckmann |
| 7,141,206 B2 | 11/2006 | Ishikawa et al. |

(Continued)

FOREIGN PATENT DOCUMENTS

| CN | 101781464 | 7/2010 |
| DE | 196 48 164 A1 | 5/1998 |

(Continued)

OTHER PUBLICATIONS

Product Data Sheet for dicumyl peroxide, no date.*

(Continued)

*Primary Examiner* — Michael F Pepitone
(74) *Attorney, Agent, or Firm* — The Dobrusin Law Firm, PC

(57) ABSTRACT

A foamable adhesive system is provided which can achieve necessary adhesion to an oily surface and which is not tacky to the touch once applied to the surface and has a melt viscosity in the bake phase high enough to retain its shape and adhesion to the substrate and in addition a melt viscosity sufficiently high to retain gas bubbles formed by the decomposition of the blowing agent and which also retains its shape and structure once formed by use of a polymer system containing a thixotropic filler and a two compartment (component) cross linking system.

19 Claims, No Drawings

(56) References Cited

U.S. PATENT DOCUMENTS

| | | |
|---|---|---|
| 2002/0066254 A1 | 6/2002 | Ebbinghaus |
| 2002/0074827 A1 | 6/2002 | Fitzgerald et al. |
| 2003/0209921 A1 | 11/2003 | Coon et al. |
| 2004/0074150 A1 | 4/2004 | Wycech |
| 2004/0131839 A1 | 7/2004 | Eagle |
| 2004/0131840 A1 | 7/2004 | Ferguson et al. |
| 2004/0181013 A1 | 9/2004 | Schenkel |
| 2004/0262853 A1 | 12/2004 | Larsen et al. |
| 2004/0266898 A1 | 12/2004 | Kassa et al. |
| 2005/0048276 A1 | 3/2005 | Wilson |
| 2005/0081383 A1 | 4/2005 | Kosal et al. |
| 2005/0119372 A1 | 6/2005 | Czaplicki et al. |
| 2005/0159531 A1* | 7/2005 | Ferng et al. ............. 524/487 |
| 2005/0172486 A1 | 8/2005 | Carlson et al. |
| 2005/0249916 A1 | 11/2005 | Muto et al. |
| 2005/0268454 A1 | 12/2005 | White |
| 2006/0127584 A1 | 6/2006 | Lande |
| 2008/0265516 A1* | 10/2008 | Walker .............. B29C 44/188 277/316 |
| 2010/0065210 A1* | 3/2010 | Schuft et al. ............. 156/330 |

FOREIGN PATENT DOCUMENTS

| | | |
|---|---|---|
| DE | 198 58 903 A1 | 12/1998 |
| EP | 0 383 498 B1 | 3/1993 |
| EP | 0 710 696 A2 | 5/1996 |
| EP | 0 893 332 A1 | 1/1999 |
| EP | 1 006 022 A2 | 6/2000 |
| EP | 0 893 332 B1 | 3/2002 |
| EP | 1 256 512 A2 | 11/2002 |
| EP | 1 006 022 B1 | 9/2003 |
| EP | 1 134 314 B1 | 9/2004 |
| EP | 1 155 082 B1 | 9/2004 |
| EP | 1 666 228 A2 | 6/2006 |
| EP | 1921121 | 5/2008 |
| EP | 1921121 A1 | 5/2008 |
| FR | 2115177 | 7/1972 |
| JP | 57-117542 | 7/1982 |
| JP | 58-87668 | 6/1983 |
| JP | 01 069 308 | 3/1989 |
| JP | 7-31569 | 7/1995 |
| JP | 8-207071 | 8/1996 |
| JP | 11-106544 | 4/1999 |
| JP | 11 106544 | 4/1999 |
| JP | 2001-062860 | 3/2001 |
| JP | 2001-88739 | 4/2001 |
| JP | 2002-120250 | 4/2002 |
| JP | 2002249627 | 9/2002 |
| JP | 2003-226261 | 8/2003 |
| WO | WO97/02967 | 1/1997 |
| WO | WO96/22324 | 5/1997 |
| WO | WO98/36944 | 8/1998 |
| WO | WO99/02578 | 1/1999 |
| WO | WO99/48746 | 9/1999 |
| WO | WO00/12595 | 3/2000 |
| WO | WO 00/13958 | 3/2000 |
| WO | WO00/20483 | 4/2000 |
| WO | WO00/37242 | 6/2000 |
| WO | WO00/37302 | 6/2000 |
| WO | WO00/37554 | 6/2000 |
| WO | WO00/52086 | 9/2000 |
| WO | WO01199667 | 3/2001 |
| WO | WO01/54936 | 8/2001 |
| WO | WO02/055923 | 7/2002 |
| WO | WO02/088214 | 11/2002 |
| WO | WO03/059997 | 7/2003 |
| WO | WO03/061934 | 7/2003 |
| WO | WO03/078163 | 9/2003 |
| WO | WO03/093387 A1 | 11/2003 |
| WO | WO04/060984 | 7/2004 |
| WO | WO04/062869 | 7/2004 |
| WO | WO04/065485 | 8/2004 |
| WO | 2004/076507 | 9/2004 |
| WO | 2005/002950 | 1/2005 |
| WO | WO05/077634 A2 | 8/2005 |
| WO | WO05/090431 | 9/2005 |
| WO | WO06/131190 | 12/2006 |
| WO | 2012/041513 | 4/2012 |

OTHER PUBLICATIONS

International Search Report & Written Opinion dated Dec. 23, 2011; Appln. No. PCT/EP2011/004891.
UK Search Report dated Jan. 10, 2011; Appln. No. GB1016530.6.
International Preliminary Report on Patentability dated Apr. 11, 2013; Appln. No. PCT/EP2011/004891.
European Communication dated May 27, 2013; Appln. No. EP11773388.1.
Japanese Office Action dated Nov. 19, 2013; Appln. No. 2013-24116.
Copending U.S. Appl. No. 10/718,509 filed Nov. 20, 2003.
Copending Patent Application Serial No. GB 0220945.0 filed Sep. 10, 2002.
Copending Patent Application Serial No. EP 0300159.1 filed Jan. 6, 2003.
Copending U.S. Appl. No. 11/188,679 filed Jul. 25, 2005.
Copending U.S. Appl. No. 11/189,190 filed Jul. 26, 2005.
Copending U.S. Appl. No. 11/254,129, filed Oct. 19, 2005.
Copending U.S. Appl. No. 60/753,973, filed Dec. 23, 2005.
Copending U.S. Appl. No. 11/339,431, filed Jan. 25, 2006.
Copending U.S. Appl. No. 11/390,658, filed Mar. 28, 2006.
Copending U.S. Appl. No. 11/391,884, filed Mar. 29, 2006.
Copending U.S. Appl. No. 11/339,535, filed Mar. 30, 2006.
Copending U.S. Appl. No. 11/393,431, filed Mar. 30, 2006.
Copending U.S. Appl. No. 11/401,207, filed Apr. 10, 2006.
Copending U.S. Appl. No. 11/381,769, filed May 5, 2006.
Copending U.S. Appl. No. 60/746,810, filed May 9, 2006.
Copending U.S. Appl. No. 60/747,677, filed May 19, 2006.
Copending U.S. Appl. No. 60/804,117, filed Jun. 7, 2006.
Copending U.S. Appl. No. 11/422,705, filed Jun. 7, 2006.
Copending U.S. Appl. No. 60/820,295, filed Jul. 25, 2006.
Copending U.S. Appl. No. 10/597,610, filed Aug. 1, 2006.
Copending U.S. Appl. No. 11/461,557, filed Aug. 1, 2006.
Copending U.S. Appl. No. 11/463,662, filed Aug. 10, 2006.
Klein et al., Application of Structural Foam in the Body in White.
Copending U.S. Appl. No. 11/467,185, filed Aug. 25, 2006.
Copending U.S. Appl. No. 60/824,991, filed Sep. 8, 2006.
Copending U.S. Appl. No. 11/531,067, filed Sep. 12, 2006.
Copending U.S. Appl. No. 60/828,704, filed Oct. 9, 2006.
Copending U.S. Appl. No. 11/549,781, filed Oct. 16, 2006.
Zalobsky et al., "Recommendations on Selection and Use of Cavity Reinforcement Materials" Proceedings of the 1999 Noise and Vibration Conference.
Liu et al., "Validation of Epoxy Foam for Structural and Crash Application", 2004 SAE World Congress, Mar. 8-11, 2004.
Casey et al., "Expandable Epoxy Foam: A Systematic Approach to Improve Vehicle Performance", 2004 SAE World Congress, Mar. 8-11, 2004.
International Search Report dated Mar. 12, 2007. PCT/US06/041574.
Database WPI Week 198528 Derwent Publications Ltd., London, GB, An 1985-167916, XP002422534 & JP 60 096681 A, Nitto Electric Ind Co. Abstract.
Database WPI Week 198717 Derwent Publications Ltd., London, GB; An 1987-119231, XP002422535 & JP 62 062882 A, IIDA Sangyo KK. Abstract.
Database WPI Week 199806 Derwent Publications Ltd., London, GB; An 1998-056303, XP002422536 & JP09176616 A, NITTO Denko Corp. Abstract.
Chinese Second Office Action dated Apr. 1, 2015; Application No. 201180051072.3.

* cited by examiner

FOAMED ADHESIVE

The present application claims the benefit of the filing date of PCT Application Ser. No. PCT/EP2011/004891 (filed Sep. 30, 2011) (Published as WO 2012/041513), which claims priority to GB 1016530.6 (filed Sep. 30, 2010), the contents of both of these applications being hereby incorporated by reference in their entirety.

The present invention relates to foamable adhesives and in particular to hot melt foamable adhesives which can be applied to metal as a hot melt and used to bond together metal components such as those employed in the automobile and aircraft industries. In particular the invention relates to foamable adhesives having good adhesion to oily surfaces and which provides a soft flexible foamed adhesive.

Foamable adhesives are well known and they are employed in the bonding together of metal components employed in the automobile and other industries. Typically the adhesives have a paste like consistency and are not dry to the touch. This means that if the adhesive is applied to one component which is then transported for bonding to a second component care must be taken in handling to prevent the tacky adhesive surface taking up dirt.

The adhesives will go through a temperature cycle in order to function as a foamable adhesive. Initially it will be applied to a substrate as a melt at a temperature at which it will adhere to the substrate but will not foam; usually it will then be cooled. Next it will be subject to a bake phase in which its temperature is raised to the foaming temperature and then foamed at the foaming temperature where it also develops additional adhesive properties. Finally it will be cooled having performed the adhesive function.

The present invention controls the melt viscosity at the various temperatures to optimise performance. The melt viscosity of the adhesives must be controlled so that they can be readily applied at the desired temperature. Typically the adhesives are applied by extrusion. This requires a low melt viscosity however, once applied and prior to activation and foaming the adhesive should be dry to the touch and retain its shape and location for subsequent processing particularly during any heat up to the foaming temperature when a low melt viscosity material can sag and perhaps drop off the substrate. In the subsequent processing when the adhesive formulation is again melted and the blowing agent is activated to cause foaming the initial melt viscosity of the formulation should be high enough to prevent undesirable flow or sag of the molten composition prior to foaming and subsequently high enough to trap the gasses produced by the blowing agent. In this way the adhesive can retain its location on the substrate and can also expand and retain its foamed structure and develop adhesive properties at the temperatures employed in the assembly process in which it is used for bonding of components. However in certain applications such as in body-shops in the automobile industry use of an adhesive having a melt viscosity suitable for extrusion will not produce a bond of sufficient strength on oily metal surfaces and the adhesive can be removed through adhesive failure before it is activated during metal cleaning and other metal pre treatment processes such as dipping or jet spraying. In one aspect the invention is concerned with providing a foamable adhesive with adequate adhesion to oily metal surfaces prior to foaming and any undesirable adhesive failure is cohesive failure.

PCT publication WO2004/076507 relates to reactive hot melt adhesives which do not have the handling difficulties of viscous liquid compositions by providing the reactive hot melt adhesive in the form of free flowing pellets. The adhesives are designed so that they do not have the handling difficulties of viscous liquid compositions and give good wash-off and squeeze resistance. The adhesives are prepared by using cross linkable polymers such as ethylene-acrylic acid copolymer, ethylene-methacrylic copolymer or an ethylene-acrylic acid—methacrylic acid terpolymer together with a free radical inhibitor. A foaming agent, a free radical initiator, a filler and an adhesion promoter are included in the adhesive formulation and up to 25 wt % of additional copolymers may also be included.

WO2005/002950 describes an expandable material comprising about 10% to about 70% of a polymeric mixture including one or more acrylates, one or more acetates or both, about 6% to about 20% of a tackifier, a blowing agent, blowing agent accelerator or both, a curing agent and optionally one or more fillers. WO2005/002950 is not however concerned with the application of the material to oily surfaces or controlling melt viscosity during application, bake phase and foaming. Furthermore any failure of the adhesive prior to or after foaming tends to be in the adhesive mode that is between the adhesive and the surface.

The present invention provides an adhesive formulation which can be applied to oily surfaces as a hot melt to provide a dry to the touch at ambient temperature adhesive on the surface and which has sufficient adhesion to the oily surface. The adhesive is also foamable and curable at temperatures above the application temperature and develops adhesive properties at the foaming temperature. In some instances the adhesive can be used for adhering to oily metal components without the need for the pre treatment and cleaning degreasing techniques that are currently required. Furthermore, any adhesive failure tends to be in the cohesive mode that is within the adhesive as opposed to between the adhesive and the surface.

The formulation therefore combines the ability to be applied as a hot melt, to obtain sufficient adhesion to oily surfaces, to be non-tacky to the touch when in the non-foamed state that has been cooled after application, to retain its shape when it is being heated to the foaming temperature and to foam and develop adhesive properties when heated to a temperature above the application temperature and to retain the foam structure. This combination of features is obtained through selection of polymers that provide the adhesive properties and the control of the melt viscosity over the temperature range of use of the adhesive through the use of a thixotropic filler and a cross-linking system.

The present invention therefore provides a hot melt adhesive formulation comprising
 (i) one or more solid polymers
 (ii) a thixotropic filler
 (iii) a blowing agent system
 (iv) a cross linking system comprising
  a first cross linking agent having an activation temperature within the temperature range at which the adhesive is heated up to the foaming temperature to increase the melt viscosity of the adhesive to at temperatures within the bake phase and a second cross linking agent with an activation temperature within the range of the foaming temperature to cause the foamed formulation to cross link.

The temperature range at which after application the adhesive is heated up to the foaming temperature is referred to herein as the bake phase of the cycle. The invention reduces the tendency of the adhesive to sag and perhaps fall away from the substrate due to adhesive failure during this phase.

The adhesive wets the surface to which it is applied which improves the absorption of any oil and other contaminants on the surface to improve adhesion and here a low melt viscosity is required.

Use of the adhesive formulation of the invention therefore allows application of the adhesive to a substrate in one location to provide a substrate supporting a non-tacky heat activatable adhesive. The substrate may, if desired be transported to a second location where it can be assembled and the system heated through the bake cycle to cause foaming and the development of adhesive properties. Use of the adhesive of the invention has the benefit that the likelihood of adhesive failure between the adhesive and the substrate during the bake phase of the cycle is reduced.

This can be particularly useful in industries such as the automobile, rail and aircraft industries where components such as panels are prepared in one location and transported to another location for assembly. The adhesives are also particularly useful in the extrusion in place applications such as are described in United States Patent Publication 2006/0127584 where they may be applied by the techniques described in one location and then shipped elsewhere.

The presence of the first cross linking agent together with the thixotropic filler allows the formulation to be applied for example by melt coating such as extrusion at a low melt viscosity whilst retaining its shape, to adhere to a surface with sufficient strength and yet be dry to the touch when cool and to retain its adhesion to the substrate and its shape during the bake phase. It is preferred that the first cross linking agent has an activation temperature in the range 80° C. to 150° C., more preferably 100° C. to 130° C. It is also preferred that it have a relatively short half life within this temperature range.

The adhesive is formulated so that it will foam at a higher temperature than that at which it is applied to the substrate. The presence of the second cross linking agent which is activated at the higher foaming temperature will therefore be activated during the foaming stage to increase the viscosity to retain the gasses generated by the blowing agent and to provide strength to the foamed structure. It is preferred that second cross-linking agent has an activation temperature in the range 130° C. to 220° C. more preferably 140° C. to 180° C. and has a long half life at a temperature in the activation range of the first cross linking agent.

The polymers used in the present invention are preferably copolymers (and terpolymers) of ethylene. In particular, unsaturated esters such as vinyl esters and acrylic and methacrylic esters are effective. The term copolymer as used herein refers to polymers of two or more monomers. Particularly preferred are ethylene/acrylic ester copolymers and more particularly copolymers of ethylene and butyl acrylate preferably n-butyl acrylate. Examples of polymers that may be used include (i) Ethylene vinyl acetate copolymers
(ii) Ethylene methyl acrylate copolymers
(iii) Ethylene butyl acrylate copolymers
(iv) Ethylene 2 hexylethyl acrylate copolymers
(v) Polyamide polymers
(vi) Glycidyl methacrylate, acrylic ester, ethylene copolymers
(vii) Carboxylated ethylene methyl copolymers
(viii) Carboxylated ethylene butyl acrylate copolymers
(ix) Ethylene terpolymers
(x) Maleic anhydride grafted polymers The polymers may comprise from 30 to 90 wt % of the formulation, preferably 50 to 80 wt % and mixtures of these polymers may be used.

It is preferred to use a polymer blend containing an adhesion promoting resin in the blend and the preferred polymer system comprises (i) one or more of the ethylene/unsaturated ester copolymers and
(ii) an adhesion promoting resin The choice of the ethylene/unsaturated ester copolymers will depend upon the use to which the adhesive is to be put. However a particularly preferred mixture comprises two ethylene acrylate ester copolymers together with an ethylene vinyl acetate copolymer and an adhesion promoting resin. We have found that the use of a combination of a high melt index ethylene acrylate copolymer, an ethylene vinyl acetate copolymer and an adhesion promoting resin provides low melt viscosity at the application temperature and good adhesive properties to oily surfaces.

In particular we have found that an ethylene acrylate copolymer have a 320 g/10 min melt flow index (ISO 1133 190° C., 2.16 kg) combined with an ethylene vinyl acetate copolymer having a 800 g/10 min 2.16 kg), cohesive adhesion failure can be obtained.

The inclusion of the first cross linking agent and the thixotropic filler further providing a dry to the touch adhesive after application which can be expanded to produce an adhesive foam with good retention properties.

The adhesion promoting resins may be any of those known in the art and may be aliphatic or aromatic hydrocarbon resins or may be natural terpene based resins. Preferred resins are those sold by CRAY VALLEY under the trade name Norsolene in particular the aromatic resins of softening point in the range 95 to 115° C. such as Norsolene S105. The presence of the ethylene vinyl acetate copolymer together with the adhesion promoting resin provides a formulation with a relatively low yield point and melt viscosity which then allows oil to migrate from the metal surface into the polymer matrix so that the melted polymer can absorb surface contamination. In addition it allows the melted compound to conform more readily to the surface. We prefer to use from 10 to 30 wt % based on the formulation of an adhesion promoting resin.

A preferred polymer mixture comprises a first ethylene/n-butyl acrylate copolymer containing 35 wt % n butyl acrylate and having a melt index of 320 (g)/10 min a second ethylene/acrylate copolymer having a melt index of 8 g/10 min, an ethylene/vinyl acetate copolymer containing 28 wt % vinyl acetate and having a melt index of 800 g/10 min, and a hydrocarbon adhesion promoting resin For example we have found that a formulation of this invention can have the following properties at the shear rates quoted.

When measured on a parallel disc rheometer at 1% strain. It is preferred that the viscosity is in the range 500 to 1000 Pa·s under 1 $s^{-1}$ shear rate at 90° C. and in the range 100 to 5000 Pa·s under 100 $s^{-1}$ shear rate. Typical values are

| | Melt Viscosity (Pa · s) | |
|---|---|---|
| Temp | Shear Rate: 1$S^{-1}$ | Shear Rate: 100$S^{-1}$ |
| 80° C. | 200 to 3700 | 300 to 913 |
| 90° C. | 1200 to 2112 | 350 to 380 |
| 100° C. | 1000 to 1990 | 290 to 330 |

The benefits of the lower viscosity must however be balanced with the ability of the adhesive to retain its shape during the bake phase and to trap the gasses during foaming and to avoid unwanted flow of the molten polymer system during the bake phase at the foaming temperature. Accordingly it is necessary to include ingredients which increase the polymer melt viscosity during the foaming and bake cycle but which do not impair the fluidity required for melt application of the adhesive for example by extrusion. This is accomplished by the inclusion of second cross linking agent.

The thixotropic filler is preferably silica particularly useful is fumed silica. Other thixotropic fillers that may be used include polyamide wax, acrylic polymers particularly high molecular weight polymers, layered silicates and modified ureas. We prefer to use treated silica to limit moisture uptake during storage of the formulation and organo silane treated silica is preferred. We have found that from 1 wt % to 15 wt %, preferably 2 wt % to 8 wt % of the filler based on the total weight of the formulation is particularly useful to obtain the desired melt viscosity during the curing bake cycle.

Any suitable cross linking agents having the required activation temperature and crosslinking kinetics at the appropriate temperature may be used. Examples of suitable materials include sulphur cure systems, peroxides, resin cure systems and metallic oxide cure systems. The cross linking system comprises a first cross linking with fast kinetics at low temperature (bake starts, for example a (half life) of less than 30 minutes at 100° C. together with a second cross linking agent having a long (half life) (such as several hours) at a bake start temperature, but a short (half life) when the nominal bake temperature is reached, for example less than 5 minutes at 150° C.

We have found that a combination of benzoyl peroxide (half life at 100° C. of 23.4 minutes) and 1,1'(di-tertiary-butylperoxide)-3,3,5trimethyl cyclohexane peroxide (half life at 100° C. of 376 minutes, half life at 150° C. 1.3 minutes) is particularly useful. The benzoyl peroxide will decompose first during the bake phase of the adhesive at below the foaming temperature so forming a gel in the molten polymer formulation to increase its viscosity; we have found that up to 0.1 wt % to 5 wt % of benzoyl peroxide based on the weight of the formulation is particularly useful. It may be used in a form that is absorbed on a mineral filler. The 1,1'(di-tertiary-butyl peroxy-)3,3,5trimethyl cyclohexane peroxide decomposes more slowly at the activation temperature and quickly at the foaming temperature so that it will consolidate the foam structure, again up to 0.1 wt % to 5 wt % can be used. The cross linking system can also contain an activator for the cross linking agents which can be used to synchronize the cross link speed with the blowing agent decomposition kinetics. An example of an activator that can be used is bisphenol A diacrylate.

The blowing agent will be selected according to the temperature at which foaming is to be accomplished. The blowing agent may be a physical or a chemical blowing agent, a physical blowing agent can comprise a volatile gas trapped in a thermoplastic shell which softens and lets the gas expand at the foaming temperature. However chemical blowing agents which decompose to produce gas on heating such as azodicarbonamide, P toluene sulfide hydrazide (TSH) and pp' oxybis (benzene) sulfonyl hydrozide (OBSH) are preferred and it is preferred to use from 1 to 10 wt % based on the weight of the formulation. The blowing system may also comprise an activator which allows the expansion rate to be synchronized with the cross linking reaction. Zinc oxide is a suitable activator and again from 1 to 10 wt % based on the weight of the formulation may be used.

Accordingly by suitable choice of the cross linking system and the blowing agent system the viscosity of the formulation from application through baking, expansion and cure can be controlled to obtain adequate adhesion, a non tacky material at ambient temperature, a material that retains its shape during the bake phase, a controlled foaming and a foam that retains its structure. Typically excellent adhesion can be accomplished when formulations of the present invention are applied to a substrate at a temperature in the range 70 to 120° C. and the foaming and the foaming and development of adhesive properties are activated at a temperature in the range 140° C. to 220° C. During application it is preferred that the melt viscosity index is from 20 to 80 g 110 (10) mins at 90° C. under a 10 kg load.

Other materials that may be incorporated are fillers such as calcium carbonate and pigments.

In the preferred use of the adhesive formulations of this invention in automobile manufacture the ingredients are mixed and fed in an extruder,
    the extruder heats them to their softening point (between 70° C. and 120° C.), and shapes them in a continuous bead.

The molten bead may then be applied on a car body part which is generally preheated before application, of the adhesive as this can improve the tack of the bead. Pre-heat temperature should be similar to the molten bulk temperature of the adhesive as it is applied. The bead may be applied employing the extrusion techniques described in United States Patent Publication 2006/0127584. After cooling, the part is assembled into the vehicle. The car body assembly goes through the anticorrosion process sometimes known as e-coat. During the e-coat bake, the bead expands, (adheres) and provides a seal between the part and its environment. This can be done for vibration damping or sound deadening or dust and water sealability purpose.

The present invention is illustrated by reference to the following example.

The following ingredients were blended

| | | | | |
|---|---|---|---|---|
| Lotryl 35BA320 | Ethylene/Butyl Acrylate copolymer | 44.70 | 44.70 | 22.35 |
| Lotryl 35BA40 | Ethylene/Butyl Acrylate copolymer | | | 22.35 |
| Evatane 28800 | Ethylene/Vinyl acetate copolymer | 7.50 | 7.50 | 3.75 |
| Evatane 2805 | Ethylene/Vinyl acetate copolymer | | | 3.75 |
| Elvaloy 4170 | nButyl acrylate, glycidyl methacrylate, ethylene terpolymer | 4.50 | 4.50 | 4.50 |
| Norsolène S105 | Aromatic petroleum resin | 16.00 | 16.00 | 8.00 |
| Reagem 5110 | Hydroxylated polyester tackyfying resin | | | 8.00 |
| Omya BL | Calcium carbonate | 15.05 | 13.75 | 11.55 |
| Aerosil R202 | Silane coated amorphous silica | 4.00 | 4.00 | 6.00 |
| Bayferrox rouge 160 | Colouring agent | 0.20 | 0.20 | 0.20 |
| Luperox 231XL40 | 1,1'-di(tert-butylperoxy)-3,3,5-trimethylcyclohexane peroxyde 40% on calcium carbonate and silica | 1.50 | 1.18 | 1.18 |
| Aztec BP50 FT | Peroxide de benzoyle 50% + phthalate | 0.40 | 0.40 | 0.40 |
| SR399 | Dipentaerythritol pentaacrylate | 0.85 | 1.47 | 1.47 |

| | | | | |
|---|---|---|---|---|
| Cellcom AC7000DB | Azodicarbonamide | 2.50 | 3.50 | 3.50 |
| ZnO Neige C | Zinc oxide | 3.00 | 3.00 | 3.00 |
| Total | | 100.00 | 100.00 | 100.00 | the formulations were extruded onto a metal surface and the melt flow index was found to be 30 g/10 min at 90° C. when measured with a 10 Kg load.

After application the metal provided with the adhesive was heated up to 175 and then held for 25 minutes at 175° C. the adhesive did not sag or suffer from adhesive failure on the metal surface during the cycle and it give an expansion of (around) 750%. It was found that any rupture of the adhesive was cohesive failure and not adhesive failure.

The invention claimed is:

1. A hot melt adhesive formulation comprising:
   (i) one or more solid polymers, wherein at least one of the one or more solid polymers has a melt index within the range of about 320 to about 800 g/10 min;
   (ii) a thixotropic filler;
   (iii) a blowing agent system; and
   (iv) a two-component cross linking system comprising:
     a first benzoyl peroxide cross linking agent having an activation temperature within a temperature range of 80° C. to 150° C. and a short half-life within the temperature range so that when the adhesive is extruded in place at such a temperature range, the adhesive has a melt viscosity of from about 290 to 913 Pa·s at a shear rate of $100S^{-1}$ to flow during the application process but maintains its location on an oily substrate and is dry to the touch due to the presence of the first cross linking agent, and a second cross linking agent with an activation temperature above the activation temperature of the first cross linking agent, so that the adhesive foams and the viscosity of the adhesive is increased to retain gasses generated by the blowing agent system;
   wherein the adhesive is adapted for shipment of the oily substrate including the adhesive to a second location prior to exposing the adhesive to temperatures suitable for foaming of the adhesive.

2. A formulation according to claim 1, wherein the second cross linking agent has an activation temperature in the range of 130° C. to 220° C.

3. A formulation according to claim 1, wherein the one or more solid polymers are copolymers of ethylene and unsaturated esters.

4. A formulation according to claim 1, wherein the one or more solid polymers comprises one or more of:
   (i) ethylene vinyl acetate copolymers;
   (ii) ethylene methyl acrylate copolymers;
   (iii) ethylene butyl acrylate copolymers;
   (iv) ethylene 2 hexylethyl acrylate copolymers;
   (v) polyamide polymers;
   (vi) glycidyl methacrylate, acrylic ester, ethylene copolymers;
   (vii) carboxylated ethylene methyl copolymers;
   (viii) carboxylated ethylene butyl acrylate copolymers;
   (ix) ethylene terpolymers; and
   (x) maleic anhydride grafted polymers.

5. A formulation according to claim 1, wherein the one or more solid polymers comprise from 30 to 90 wt % of the formulation.

6. A formulation according to claim 1, wherein the one or more solid polymers comprises a polymer blend containing an adhesion promoting resin.

7. A formulation according to claim 6 in which the one or more solid polymers comprises two ethylene acrylate ester copolymers together with one or more ethylene vinyl acetate copolymer and an adhesion promoting resin.

8. A formulation according to claim 6 in which the adhesion promoting resin is an aliphatic or aromatic hydrocarbon resins or a natural terpene based resins.

9. A formulation according to claim 1, wherein the thixotropic filler is silica.

10. A formulation according to claim 1, wherein the blowing agent system consists essentially of a blowing agent and an activator.

11. A formulation according to claim 1, wherein the second cross linking agent is 1,1'-di(tert-butylperoxy)-3,3,5-trimethylcyclohexane peroxide.

12. A formulation according to claim 1, wherein the adhesive has a melt viscosity at 90° C. of from 500 to 10000 Pa·s under 1 $s^{-1}$ shear rate and from 100 to 5000 Pa·s under 100 $s^{-1}$ shear rate as measured on a parallel disc rheometer at 1% strain.

13. A formulation according to claim 4, wherein the adhesive has a melt viscosity at 90° C. of from 500 to 10000 Pa·s under 1 $s^{-1}$ shear rate and from 100 to 5000 Pa·s under 100 $s^{-1}$ shear rate as measured on a parallel disc rheometer at 1% strain.

14. A hot melt adhesive formulation comprising (i) one or more solid polymers, wherein at least one of the one or more solid polymers has a melt index within the range of about 320 to about 800 g/10 min, and comprises one or more of:
   (a) ethylene vinyl acetate copolymers;
   (b) ethylene methyl acrylate copolymers;
   (c) ethylene butyl acrylate copolymers;
   (d) ethylene 2 hexylethyl acrylate copolymers;
   (e) polyamide polymers;
   (f) glycidyl methacrylate, acrylic ester, ethylene copolymers;
   (g) carboxylated ethylene methyl copolymers;
   (h) carboxylated ethylene butyl acrylate copolymers;
   (i) ethylene terpolymers; and
   (j) maleic anhydride grafted polymers;
   (ii) a thixotropic filler including silica;
   (iii) a blowing agent system including at least one blowing agent and at least one activator; and
   (iv) a two-component cross linking system comprising:
     a first benzoyl peroxide cross linking agent having an activation temperature within a temperature range of 80° C. to 150° C. and a short half-life within the temperature range so that when the adhesive is extruded in place at such a temperature range, the adhesive has a melt viscosity of from about 290 to 913 Pa·s at a shear rate of $100S^{-1}$ to flow during the application process but maintains its location on an oily substrate and is dry to the touch due to the presence of the first cross linking agent, and a second cross linking agent with an activation temperature above the activation temperature of the first cross linking agent, so that the adhesive foams and the viscosity of the adhesive is increased to retain gasses generated by the blowing agent system;

wherein the adhesive is adapted for shipment of the oily substrate including the adhesive to a second location prior to exposing the adhesive to temperatures suitable for foaming of the adhesive.

15. A method comprising: applying the formulation of claim 1 on a substrate at a temperature in the range 60 to 120° C. and heating at a temperature in a range 130° C. to 220° C. to cause foaming and development of adhesive properties.

16. The formulation of claim 3, wherein the copolymers of ethylene and unsaturated esters are vinyl esters and/or alkyl acrylates.

17. The formulation of claim 1, wherein upon exposure to a temperature for activating only the first cross-linking agent, the adhesive has a viscosity that is sufficiently low for extrusion in place.

18. The formulation of claim 14, wherein upon exposure to a temperature for activating only the first cross-linking agent, the adhesive has a viscosity that is sufficiently low for extrusion in place.

19. The formulation of claim 16, wherein upon exposure to a temperature for activating only the first cross-linking agent, the adhesive has a viscosity that is sufficiently low for extrusion in place.

* * * * *